(12) United States Patent
Borde et al.

(10) Patent No.: US 10,875,374 B2
(45) Date of Patent: Dec. 29, 2020

(54) FRAME UNIT

(71) Applicant: SAF-HOLLAND GmbH, Bessenbach (DE)

(72) Inventors: Florian Borde, Biebergemünd (DE); Muhammet Arpaci, Aschaffenburg (DE); Philipp Bergmann, Aschaffenburg (DE)

(73) Assignee: SAF-HOLLAND GmbH, Bessenbach (DE)

(*) Notice: Subject to any disclaimer, the term of this patent is extended or adjusted under 35 U.S.C. 154(b) by 52 days.

(21) Appl. No.: 16/093,879

(22) PCT Filed: Apr. 12, 2017

(86) PCT No.: PCT/EP2017/058835
§ 371 (c)(1),
(2) Date: Oct. 15, 2018

(87) PCT Pub. No.: WO2017/178547
PCT Pub. Date: Oct. 19, 2017

(65) Prior Publication Data
US 2019/0111748 A1   Apr. 18, 2019

(30) Foreign Application Priority Data
Apr. 15, 2016 (DE) .................. 10 2016 107 048

(51) Int. Cl.
B62D 21/02 (2006.01)
B62D 21/00 (2006.01)
(Continued)

(52) U.S. Cl.
CPC ............ B60G 7/02 (2013.01); B60G 9/003 (2013.01); B60G 11/10 (2013.01);
(Continued)

(58) Field of Classification Search
CPC .......... B60G 7/02; B60G 11/10; B60G 9/003; B60G 2204/143; B60G 2206/8103;
(Continued)

(56) References Cited

U.S. PATENT DOCUMENTS 4,164,262 A * 8/1979 Skatsche ............... B60K 11/04
 123/195 C
4,194,763 A * 3/1980 Reidelbach ........... B62D 21/00
 280/784

(Continued)

FOREIGN PATENT DOCUMENTS

DE 102006060405 8/2008
DE 102009048347 B4 * 5/2018
(Continued)

OTHER PUBLICATIONS

Peaker et al. EP 0773 119A1 Machine English translation, ip.com (Year: 1997).*

(Continued)

*Primary Examiner* — Karen Beck
(74) *Attorney, Agent, or Firm* — Price Heneveld LLP (57) ABSTRACT

A frame unit for utility vehicles includes outer and inner parts and a transverse region, wherein the transverse region extends substantially transversely to the outer part and/or the inner part, wherein the transverse region is integrally formed with the outer part or the inner part, the outer part and/or the inner part has a fastening region for being secured to a vehicle frame, the outer part has an outer bearing region and the inner part has an inner bearing region, an axle guide can be arranged between the outer and inner bearing regions and can be secured to the bearing regions such that the axle guide can pivot about a bearing axis, and wherein the transverse region secures the outer part and/or the inner part against pivoting about an orthogonal in relation to the bearing axis.

5 Claims, 4 Drawing Sheets

(51) Int. Cl.
   *B60G 7/02* (2006.01)
   *B60G 9/00* (2006.01)
   *B60G 11/10* (2006.01)

(52) U.S. Cl.
   CPC .. *B60G 2204/143* (2013.01); *B60G 2206/601* (2013.01); *B60G 2206/722* (2013.01); *B60G 2206/8103* (2013.01); *B62D 21/00* (2013.01); *B62D 21/02* (2013.01)

(58) Field of Classification Search
   CPC ........ B60G 2206/722; B60G 2206/601; B62D 21/00; B62D 21/02
   See application file for complete search history.

(56) References Cited

U.S. PATENT DOCUMENTS

| | | | |
|---|---|---|---|
| 4,415,179 A | 11/1983 | Marinelli | |
| 6,073,947 A | 6/2000 | Gottschalk et al. | |
| 6,311,993 B1 | 11/2001 | Hulstein et al. | |
| 7,144,041 B2* | 12/2006 | Adams | B60G 3/145 280/789 |
| 10,053,180 B1* | 8/2018 | Gesto | B62K 5/027 |
| 2004/0090059 A1* | 5/2004 | Adams | B60G 3/145 280/789 |
| 2005/0156398 A1 | 7/2005 | Ramsey | |
| 2006/0181043 A1 | 8/2006 | Zebolsky | |
| 2006/0244234 A1 | 11/2006 | Ramsey | |
| 2010/0117404 A1* | 5/2010 | Koschinat | B62D 21/02 296/204 |
| 2011/0163527 A1* | 7/2011 | Hunt | B62D 21/02 280/785 |
| 2012/0119535 A1* | 5/2012 | Pertlik | B62D 27/065 296/29 |
| 2012/0319390 A1* | 12/2012 | Burger | B62D 21/02 280/785 |
| 2013/0161933 A1* | 6/2013 | Marten | B62D 29/008 280/797 |
| 2013/0264842 A1* | 10/2013 | Wagner | B62D 65/02 296/203.01 |
| 2014/0238767 A1* | 8/2014 | Numa | F01N 3/2066 180/309 |
| 2015/0108793 A1* | 4/2015 | Peschansky | B62D 29/041 296/204 |
| 2016/0186280 A1* | 6/2016 | Breidenbach | C21D 9/0068 148/525 |
| 2016/0272025 A1* | 9/2016 | McComsey | B60G 1/00 |
| 2016/0272027 A1* | 9/2016 | Dilworth | B60G 11/113 |
| 2017/0057558 A1* | 3/2017 | Hillebrecht | B62D 21/02 |
| 2017/0166024 A1* | 6/2017 | Andreasen | B60G 7/02 |
| 2018/0065667 A1* | 3/2018 | Maier | B62D 21/02 |
| 2019/0048912 A1* | 2/2019 | Czinger | B62D 21/02 |
| 2019/0111748 A1* | 4/2019 | Borde | B60G 7/02 |
| 2019/0277324 A1* | 9/2019 | Shiffler | B62D 21/09 |
| 2019/0337575 A1* | 11/2019 | Kellner | B62D 21/02 |
| 2019/0375456 A1* | 12/2019 | Cassway | B62D 21/02 |
| 2020/0001924 A1* | 1/2020 | Hirose | B62D 25/00 |

FOREIGN PATENT DOCUMENTS

| | | | |
|---|---|---|---|
| EP | 0773119 | 5/1997 | |
| EP | 0773119 A1 * | 5/1997 | ............. B60G 11/12 |
| EP | 1086836 A1 * | 3/2001 | ............... B60G 7/02 |
| EP | 3257691 A1 * | 12/2017 | ......... B60B 27/0047 |
| EP | 3427980 A1 * | 1/2019 | ............... B60G 7/02 |
| WO | 20080744480 | 6/2008 | |

OTHER PUBLICATIONS

European Patent Office, International Search Report, dated May 29, 2017.

* cited by examiner

FRAME UNIT

BACKGROUND OF THE INVENTION

The present invention relates to a frame unit and to a frame system for use in motor vehicles, in particular in utility vehicles.

Frame units themselves are already known from the prior art. In particular, bearing blocks which establish a connection between the longitudinal link of a vehicle chassis and the frame of the vehicle are used as a frame unit in the prior art. In this case, the bearing blocks are usually welded to the frame of the vehicle or secured to said frame by means of a screw or bolt connection. In most cases, stabilization of the bearing block by additional supporting elements which additionally have to be secured to the bearing block is required here. It has been found here that the bearing blocks known from the prior art are oversized and, in particular, cannot be adapted to local stress peaks. Furthermore, a large amount of expenditure on assembly is required for the bearing blocks known from the prior art in order to firstly fit the bearing block itself and also to fit the correspondingly required supporting elements to the bearing block and to the frame of the vehicle.

The object of the present invention is therefore to provide a frame unit and a frame system which, in particular, avoid or reduce the disadvantages known from the prior art.

SUMMARY OF THE INVENTION

According to the invention, the frame unit comprises an outer part and an inner part and a transverse region, wherein the transverse region and the outer part extend substantially transversely in relation to one another and/or the transverse region and the inner part extend substantially transversely in relation to one another, wherein the transverse region is integrally formed with the outer part or with the inner part, wherein the outer part and/or the inner part have/has a fastening region for being secured to a vehicle frame, wherein the outer part has an outer bearing region and the inner part has an inner bearing region, wherein an axle guide can be arranged between the outer and the inner bearing region and can be secured to the bearing regions such that it can pivot about a bearing axis, wherein the transverse region is designed to absorb moments from the outer part and/or the inner part about an orthogonal in relation to the bearing axis. In other words, the transverse region is designed for securing the outer part and/or the inner part against pivoting about an orthogonal in relation to the bearing axis in addition to fastening said parts to the frame of the utility vehicle. In other words, the frame unit is preferably a bearing block, in the case of which a transverse region is additionally integrally formed on one of the parts of the frame unit, outer part or inner part. Therefore, in other words, the frame unit is particularly preferably of two-part design. The two-part design of the frame unit reduces, in particular, the expenditure on assembly since fewer components have to be connected to one another and handled by an assembly technician at the same time. Furthermore, the integral design of the transverse region with in each case one of the parts, outer part or inner part, ensures a particularly high strength of the connection between the transverse region and the respective part of the frame unit, which connection provides a sufficient amount of strength even with low material thicknesses of the outer part, the inner part and/or the transverse region. Furthermore, at least one of the parts, outer part or inner part, has a fastening region for being secured to a vehicle frame. In this case, the fastening region is preferably designed as a projection or flange section which can be brought into engagement with the corresponding region of a vehicle frame in such a way that a cohesive connection or the establishment of a force-fitting and/or interlocking connection (for example a screw or rivet connection) is particularly favored. In this case, the fastening region is particularly preferably a flange-like region, which is shaped in the form of a metal sheet, on the outer part and/or on the inner part. In a further preferred embodiment, the outer part and/or the inner part can in each case have a large number of fastening regions. In this way, it is possible to be able to establish a connection between the vehicle frame and the outer part and/or the inner part, which connection can already absorb and transmit bending moments between the vehicle frame and the frame unit, even by means of the individual fastening regions. The outer part has an outer bearing region and the inner part has an inner bearing region, wherein the bearing regions are in each case preferably designed as a cutout, particularly preferably in the form of an elongate hole. An axle guide, which is known per se from the prior art, can preferably be brought into engagement with the bearing region in such a way that said axle guide is secured to the bearing regions such that it can pivot about a bearing axis and is secured against displacement transversely in relation to the bearing axis. Bolt elements or similar force-transmitting elements which engage into the bearing regions in an interlocking manner and engage in an interlocking manner with the axle guide in the section situated between the bearing region are particularly preferably used for securing the axle guide. The bearing axis about which the axle guide is pivotably arranged on the frame unit serves as a reference geometry for further features of the frame unit here. The transverse region serves primarily as a support for the outer part and/or for the inner part against pivoting about an orthogonal in relation to the bearing axis. In other words, the transverse region prevents the outer part and/or the inner part from being able to pivot perpendicularly in relation to the bearing axis with respect to the vehicle frame, wherein the transverse region absorbs corresponding moments about an orthogonal in relation to the bearing axis and additionally secures the outer part and the inner part against pivoting in order to fasten them to the vehicle frame. The transverse region preferably extends with respect to the motor vehicle, preferably the utility vehicle, along its transverse direction. In order to provide support for the outer part and/or the inner part, the transverse region is preferably supported on the vehicle frame itself or alternatively preferably on the vehicle frame by means of further intermediate elements here. The further intermediate elements provided can be supporting elements which are provided on the vehicle frame itself or, as an alternative, a second frame unit as will be described below. The advantage of the frame unit according to the invention is that it ensures support of the frame unit against pivoting about an orthogonal in relation to the bearing axis by a transverse region which is integrally formed with one of the two components of the frame unit, outer part or inner part.

In this case, the transverse region preferably has an extent along or parallel in relation to the bearing axis which is at least 1.5 times, preferably 2 to 4 times, the distance of the inner bearing region from the outer bearing region. With this preferred extent of the transverse region, said transverse region can transmit quiescent moments. In this case, the bending moments on the frame unit are introduced into the frame unit particularly by the longitudinal link of the utility vehicle, wherein a possible moment-transmitting region includes the bearing regions. The transverse region particularly preferably has an extent which is at least 1.5 times the distance of the two bearing regions from one another. In this way, the lever arm with which the transverse region can absorb moments is larger than the lever arm with which the axle guide transmits a moment about an orthogonal in relation to the bearing axis to the frame unit. This can result in secure support of the frame unit by the transverse region. The transverse region particularly preferably has a greater extent, this allowing transmission and safeguarding of higher moments, but has the disadvantage of a higher weight of the frame unit.

The transverse region advantageously extends substantially along a parallel in relation to the bearing axis. In the present context, the extent substantially along the parallel in relation to the bearing axis is essentially understood to mean an extent which is considerably greater than the extent of the transverse region in other spatial directions. In this case, the extent of the transverse region in an arbitrary direction which runs orthogonally in relation to the bearing axis is particularly preferably smaller than 0.8% of the maximum extent which runs or is measured parallel in relation to or along the bearing axis. In this way, material can be saved in the transverse region since a lever arm which also allows high torque transmission through an otherwise relatively thin-walled or slim transverse region can be produced with the extent of the transverse region parallel in relation to the bearing axis. As a result, the weight of the frame unit is reduced in particular.

The transverse region advantageously has, at its end which is averted from the outer part, a smaller extent orthogonally in relation to the bearing axis than the outer part and/or the inner part in the same direction orthogonally in relation to the bearing axis. In other words, the transverse region is, at its end which is averted from the outer part and therefore points preferably in the direction of the vehicle center or lies in the vehicle center, slim in comparison to the outer part and/or to the inner part. In this way, material can be saved in the transverse region and therefore the weight of the frame unit can be reduced. In this case, the transverse region, in the state in which the frame unit is secured to the vehicle, is advantageously designed to be slimmer both in the vertical direction, which lies orthogonally in relation to the bearing axis, and also in the horizontal direction, the longitudinal direction of the vehicle, which lies orthogonally in relation to the bearing axis, than the outer part and/or the inner part in the same directions in each case. Here, the transverse region is particularly preferably at a distance from the fastening region of the outer part and/or of the inner part in a direction which runs along the bearing axis.

The transition region from the maximum extent of the transverse region to the minimum extent of the transverse region is advantageously designed to be bent once or several times orthogonally in relation to the bearing axis. In other words, the transverse region is of minimally bent design where its extent reduces from its maximum extent in the region of the outer part or of the inner part down to its minimum extent in the region of its distal end which is averted from the outer part. An S-shaped bend with two bent regions and a turning point situated therebetween or a straight line situated therebetween is preferably provided in this case. A notch effect during bending moments and force transmission at the transverse region can be avoided in this way.

The outer part and/or the inner part and/or the transverse region are/is further preferably of sheet metal-like design. In a particularly preferred embodiment, all of the components of the frame unit, that is to say the outer part, the inner part and the transverse region, are of sheet metal-like design in each case. In the present case, sheet metal-like design means a flat planar design of the respective part of the frame unit. In this case, one of the directions of extent is advantageously substantially smaller than the respectively other directions of extent of the respective component. In other words, the outer part, the inner part and/or the transverse region are/is of flat design in each case. The components of the frame unit are particularly preferably designed as so-called tailored blanks. Tailored blanks are distinguished in that different wall thicknesses can be produced in different regions on a sheet metal-like component, and joining regions are particularly preferably provided between individual sheet metal parts which are designed to establish a particularly strong interlocking or cohesive connection between individual tailored blanks. Furthermore, it is possible to use different materials on one and the same sheet metal-like component with the aid of tailored blanks, as will be explained below.

The outer part and/or the inner part and/or the transverse region particularly preferably have/has reinforced regions of relatively high wall thickness and weakened regions of relatively low wall thickness. Particularly in the case of the parts of the frame unit being designed as tailored blanks, it is possible that regions of relatively high wall thickness and regions of relatively low wall thickness are produced on one and the same component of sheet metal-like design. In this way, the outer part and/or the inner part and/or the transverse region can be reinforced in certain regions for certain loads and can be weakened in other regions which are subject to lower forces and moments in order to save weight in these regions. In particular, it may be preferred here that reinforced regions are provided in those regions of the outer part, the inner part and the transverse region in which cohesive or interlocking connections to other components, such as the vehicle frame or the longitudinal link or a vibration damper for example, are established, whereas a lower wall thickness and therefore a lower weight is provided in the adjacent regions in each case.

A damper fastening is advantageously provided on the outer part and/or on the inner part, wherein the damper fastening is designed for indirect or direct engagement with a vibration damper or stabilizer. A damper fastening is preferably provided integrally on the outer part and/or on the inner part in each case. Here, the damper fastening is preferably a cutout in which a vibration damper can engage with the frame unit indirectly by means of a screw or directly by means of bolt-like projections which are provided on the vibration damper itself. The region of the damper fastening is particularly preferably integrally formed with the outer part or the inner part in this case, so that material damage by welding-on a region for fastening a vibration damper within the scope of the present invention can be avoided.

Preferably in the region of a damper fastening, the outer part or the inner part advantageously has a stabilizing region which bridges the distance between the outer part and the inner part and is designed for being secured in a cohesive or interlocking manner to the respectively opposite part, outer part or inner part. In this case, the stabilizing region is particularly preferably a sheet metal-like projection which particularly preferably bridges the distance between the outer part and the inner part and, in other words, therefore extends along or parallel in relation to the bearing axis. In this case, the stabilizing region serves to support the damper fastening. Further preferably, the stabilizing region can be designed for being secured to the vehicle frame, so that, in addition to the securing in the fastening region, the outer part and the inner part can each be secured to the frame of the utility vehicle by means of the stabilizing region. Furthermore, the stabilizing region increases the torsional stiffness of the frame unit and, amongst other things, also renders possible pre-assembly of the inner part and of the outer part before the frame unit as a whole is installed on the vehicle frame of a utility vehicle.

The outer part and/or the inner part and/or the transverse region further preferably have/has a reinforcement region, wherein the reinforcement region is designed as a section with the outer part and/or the inner part and/or the transverse region. In this connection, it goes without saying that the reinforcement region is only integrally connected to the components on which it is provided. A possible reinforcement region includes, in particular, a bent region of the outer part of sheet metal-like design and/or of the inner part of sheet metal-like design and/or of the transverse region of sheet metal-like design. The reinforcement region is further preferably designed as a local portion of thickened material or wall thickness on the respective components. The sheet metal-like design of the individual components of the frame unit can advantageously locally provide a reinforcement which extends transversely in relation to the main extent of the sheet metal-like material and increases, in particular, the torsional stiffness of the parts of sheet metal-like design of the frame unit.

A first reinforcement region is advantageously designed as an angled sheet-metal section in the edge region of the respective component, outer part and/or inner part and/or transverse region. Angled sheet-metal sections in the edge region of the respective component are particularly simple to produce since a large number of regions of the components can be bent in a single method step, for example in a drop-forging process. The production costs for frame units can be lowered in this way. In this case, an additional change in joining which produces advantageous material properties of the respective components of the frame unit additionally takes place when carrying out this shaping process. Therefore, producing a first reinforcement region which is designed as an angled sheet-metal section can not only increase the torsional stiffness of the component but also increase the strength in the edge region between the component and its reinforcement region overall.

A second reinforcement region is advantageously designed as a portion of thickened material of the respective component, outer part and/or inner part and/or transverse region. The second reinforcement region is therefore, as already described above, designed as a section with a locally increased wall thickness and has the corresponding advantages.

A second reinforcement region is advantageously provided on at least the outer bearing region, wherein the wall thickness, measured along the bearing axis, of the second reinforcement region is greater than the wall thickness of the outer part outside the outer bearing region. Here, the wall thickness of the outer part outside the bearing region is defined in particular as the average wall thickness of the outer part outside the bearing region. Since a second reinforcement region is provided on the outer part, a greater force can be transmitted by means of the outer bearing region. In this case, the second reinforcement region is provided at least on the outer bearing region. Within the scope of the present invention, the outer part is preferably that part which is acted on by relatively high forces. A second reinforcement region is preferably also provided on the inner bearing region, particularly if the inner part also has to transmit forces of similar magnitude to the outer part, wherein said second reinforcement region has a greater wall thickness than the average wall thickness of the inner part outside the inner bearing region in this case. In this way, the outer part and the inner part can preferably be adapted to the forces to be absorbed and an optimized stress distribution within the material, preferably the sheet metal-like material, of the components of the frame unit is possible.

The outer part and/or the inner part and/or the transverse region are/is advantageously each formed from at least two different production materials. As an alternative or in addition, one or two of the components outer part, inner part or transverse region is/are preferably produced from a different material to the respectively other components outer part, inner part or transverse region. In this way, the frame unit can advantageously be even better adapted to the specific stress states and loads. In this case, the bearing region is particularly preferably composed of a different, stronger material, for example high-strength, lower-wear steel than the remaining regions of the outer part and/or of the inner part. The outer part is further preferably advantageously produced from stronger material than the inner part which can advantageously be produced from more cost-effective metal. A composite material can advantageously be used for total or local reinforcement on one of the components. For example, in particular, tape laying with unidirectional fibers has been found to be an advantageous reinforcement within the scope of the present invention.

The transverse region advantageously has, at its end which is averted from the outer part, an engagement region for being directly secured to the vehicle frame. The transverse region can particularly preferably be connected, at its distal end which points inward or toward the vehicle center, to the vehicle frame. In this way, the assembly comprising the inner part and the transverse region or the outer part and the transverse region can in each case be secured against pivoting about the longitudinal axis of the vehicle.

The invention provides a frame system which has two frame units having the features described above, wherein the first frame unit has a first outer part, a first inner part and a first transverse region, wherein the second frame unit has a second outer part, a second inner part and a second transverse region, wherein the first inner part and the second inner part are arranged between the first outer part and the second outer part, wherein the first transverse region and the second transverse region can be or are indirectly or directly secured to one another or are integrally formed with one another. Preferably, two frame units having the above-described features are arranged on a frame system and are or can be secured to the vehicle frame. In this case, the two frame units each have a transverse region, wherein the transverse regions are designed particularly for being indirectly or directly secured to one another. In a further preferred embodiment, the transverse regions are integrally formed with one another, wherein, owing to the integral design of the respective transverse region with either the inner part or the outer part of the respective frame unit, these corresponding components are also integrally formed with one another by means of the two integral transverse regions. The advantage of the feature that the transverse regions are secured to one another or are integrally formed with one another is that the transverse regions do not have to be secured to the vehicle frame in the region of the vehicle center, but rather the transverse regions can be supported against one another and therefore can prevent a pivoting movement of the two frame units about the vehicle longitudinal axis, or about an orthogonal in relation to the bearing axis, in a simple manner and independently of the vehicle frame.

The first and the second transverse region advantageously form an overlap region, wherein a connection between the first and the second transverse region can be established in the overlap region, which connection transmits bending moments about an orthogonal in relation to the longitudinal axis. Owing to the overlap of the first and the second transverse region in the overlap region, it is not only possible to transmit bending moments more effectively in this region. Furthermore, it is preferably also possible to adapt the frame system to vehicle frames of different widths by the transverse regions being pushed one into the other in an overlapping manner to a greater or lesser extent. The overlap region preferably has an extent parallel in relation to the bearing axis, which extent is 0.02 to 0.09 times or 0.1 to 0.2 times or 0.21 to 0.3 times the maximum distance of the two outer parts from one another. Given an overlap of only 0.02 to 0.09 times the total maximum distance of the two outer parts from one another, the lever arm in the overlap region is relatively small, wherein only comparatively low moments can be absorbed in the overlap region. However, at the same time, the weight of the frame system is also considerably reduced since little excess material is provided by the only relatively small overlap of the transverse regions. In the preferred range of 0.1 to 0.2 times the maximum distance of the two outer parts from one another, the overlap is large enough to absorb even relatively large moments, wherein, however, the weight can also be kept relatively low. In this case, this preferred range is particularly suitable for standard utility vehicles which are designed for use on roads in particular. The further preferred range of 0.21 to 0.3 times the maximum distance of the two outer parts from one another is capable of transmitting the highest possible bending moments in this case, wherein, however, a relatively high weight of the frame system has to be accepted in comparison to the smaller preferred overlap lengths. In this case, the preferred overlap range of 0.21 to 0.3 is particularly suitable for utility vehicles which are used on rough terrain and in the case of which relatively high forces are transmitted to the frame units by means of the longitudinal links, which forces have to be absorbed by the overlap region between the first and the second transverse region.

As an alternative, the overlap region preferably has an extent parallel in relation to the bearing axis which is 0.05 to 0.18 times, and preferably 0.1 to 0.15 times, the maximum distance of the first outer part from the second outer part. In the preferred range of 0.05 to 0.18 times the maximum distance of the two outer parts from one another, a good compromise between transmittable bending moments and a weight which is kept low is possible according to experiments by the applicant when designing the frame system for the majority of known utility vehicles. In the narrower, particularly preferred range of 0.1 to 0.15, the best compromise between adequate strength and low weight can be achieved in each case for the is for utility vehicles which only drive on sealed roads.

The first outer part is advantageously integrally formed with the first transverse region and the second transverse region and the second outer part. In the case of this particularly preferred embodiment, the two outer parts are each integrally formed with the transverse regions, wherein the transverse regions are also each integrally formed with one another. This results in a single component which combines various functions. It is further preferably possible to transmit high forces and moments, which are introduced into the two outer parts, by the integral design of the first transverse region with the second transverse region, wherein the wall thickness can be considerably reduced, in particular in comparison to an overlap of the first transverse region with the second transverse region.

As an alternative, the first transverse region and the second transverse region are preferably indirectly or directly secured to one another in a cohesive manner. In particular, a weld seam which is produced directly between the first transverse region and the second transverse region can be provided for this purpose. Indirect securing is considered to be, in particular, welding of the first and of the second transverse region to an additionally provided component which allows, in particular, the extent of the frame system parallel in relation to or along the bearing axis to be adjusted. Further preferably, the component size of the individual components can be reduced, and therefore easier handling for an assembly technician can be achieved, by splitting up the first transverse region and the second transverse region and an additionally provided component. The first transverse region and the second transverse region are preferably indirectly and/or directly secured to one another in an interlocking manner. A combination of a recess with a projection or a recess with a corresponding engagement geometry on the respectively opposite transverse region can especially preferably be provided on the transverse regions in each case, by means of which combination said transverse regions can hook one into the other and then additionally be secured by means of further elements which are connected to the transverse regions in an interlocking manner. The advantage of an interlocking connection of the first transverse region and the second transverse region with one another is that this connection is releasable and therefore simple dismantling of the frame system is rendered possible.

A connecting element is preferably provided, which connecting element can be brought into engagement with the first transverse region and with the second transverse region in order to transmit a bending moment about an orthogonal in relation to the bearing axis from the first to the second transverse region and vice versa. In this case, the connecting element is preferably a sheet metal-like component which can be brought into engagement with the respective outside geometry of the first transverse region and of the second transverse region in each case in order to secure the first and the second transverse region against pivoting in relation to one another. In this case, the transverse regions can preferably be pushed into the connecting element. As a result, it is possible, in particular, to compensate for size differences on various vehicle frames of various utility vehicles in a simple manner.

The connecting element advantageously forms with the first transverse region and with the second transverse region in each case by means of an overlap along the bearing axis, wherein the connecting element has an extent along or parallel in relation to the bearing axis which is greater than the sum of the overlap with the first and with the second transverse region. In other words, the connecting element has a greater extent along or parallel in relation to the bearing axis than the length with which it engages with the first and the second transverse region in each case. In this way, it is possible for one and the same connecting element to be used for vehicle frames of different widths. One disadvantage with oversizing of the connecting element in this way is the increased weight of the frame system.

In this case, the extent of the connecting element is advantageously 1.1 to 2.5 times, and preferably 1.3 to 2 times, the sum of the overlaps with the first and the second transverse region. It has been found within the scope of the present invention that a range of from 1.1 to 2.5 for the ratio of the extent of the connecting element to the sum of the overlaps with the first and second transverse regions allows a good compromise between a low weight of the frame system and an adequate possible way of setting the total width of the frame system overall. In this case, the particularly preferred range of from 1.3 to 2 of this ratio allows, in particular for utility vehicles in which there is a certain degree of standardization, one and the same connecting element to be used for the majority of the utility vehicles known to the applicant in order to be able to use a large number of different utility vehicles with the respective frame system.

The first inner part advantageously has a first flange section and the second inner part advantageously has a second flange section, wherein the inner parts can be secured to a respective outer part by means of a flange section in each case. The inner part is advantageously connected to the respective outer part by means of a weld connection in the region of the flange section. Weld connections have the advantage that they achieve a high strength with a low additional increase in weight. If the ability to dismantle the frame system is preferred, the inner part can also be connected to the respective outer part by means of interlocking releasable connections, such as a screw connection for example, in the region of the flange section.

Further advantages and features of the present invention can be gathered from the following description with reference to the appended figures. It goes without saying here that individual features shown only in one of the figures can also be used in embodiments which are illustrated in the respectively other figures, provided that this has not been explicitly ruled out or is prohibited due to technical circumstances.

DETAILED DESCRIPTION OF THE PREFERRED EMBODIMENTS

Figure 1:
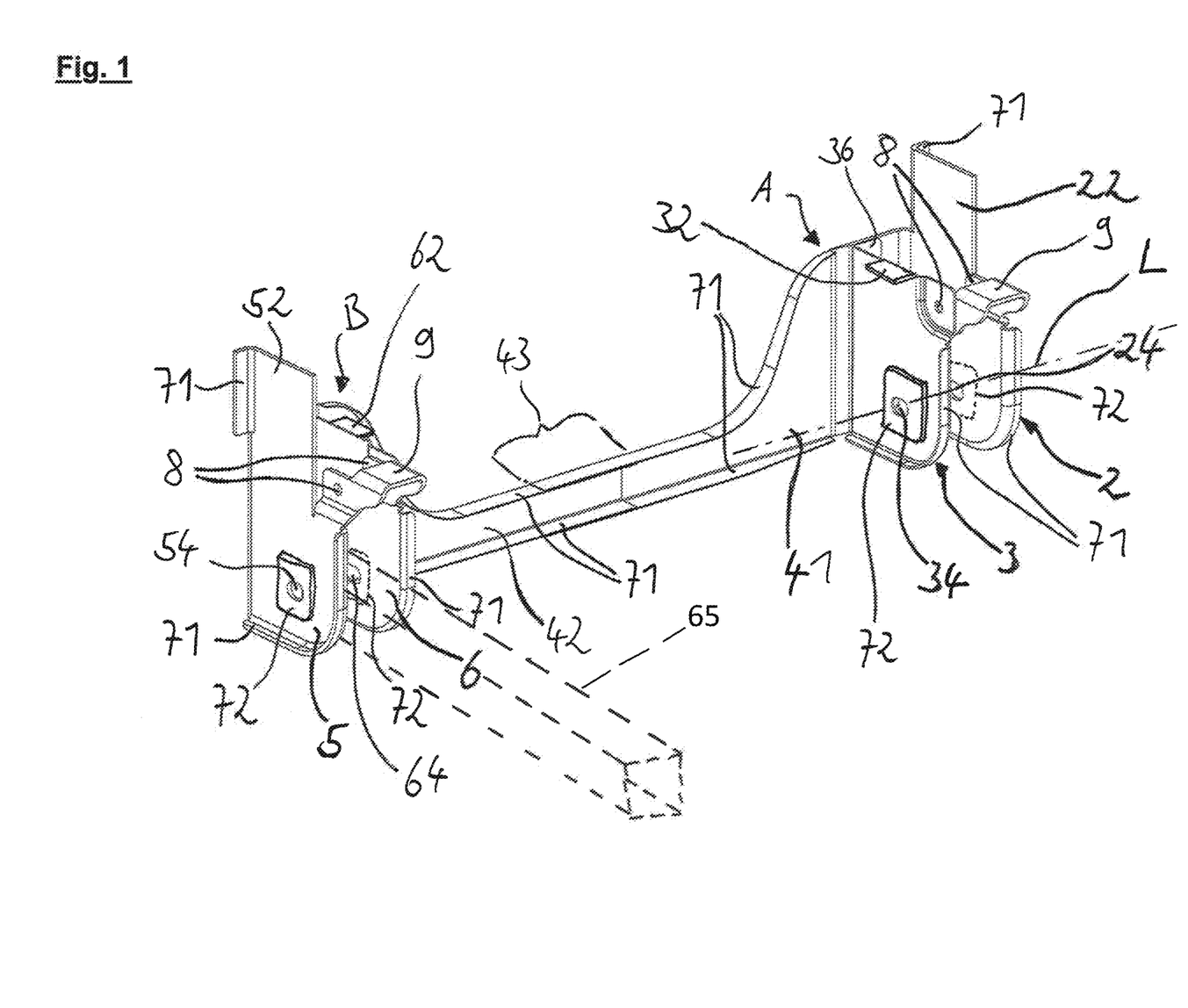
FIG. 1 shows a perspective view of a frame system.

The frame system illustrated in FIG. 1 has a first frame unit A and a second frame unit B, wherein the first frame unit A has a first outer part 2, a first inner part 3 and a first transverse region 41. The second frame unit B accordingly has a second outer part 5, a second inner part 6 and a second transverse region 42. All of the components of the frame system are preferably of sheet metal-like design, that is to say they have a substantially lower extent in at least one spatial direction than in the other spatial directions. The first outer part 2 has an outer bearing region 24 and the first inner part has an inner bearing region 34. A longitudinal link of the utility vehicle chassis can be secured in a pivotable manner between the bearing regions 24, 34. In this case, the longitudinal link can be secured to the first frame unit A such that it can pivot about a bearing axis L. Analogously to this, the second outer part 5 has an outer bearing region 54 and the second inner part 6 has an inner bearing region 64. It is particularly preferred here that, in the assembled state of the frame system, all of the outer bearing regions 24, 54 and inner bearing regions 34, 64 allow pivotable bearing of two axle guides 65 about one and the same bearing axis L. In other words, the bearing regions 24, 34, 54, 64 are oriented coaxially in relation to one another. The first outer part 2 preferably has a fastening region 22 and the second outer part 5 preferably has a fastening region 52, wherein the fastening regions 22, 52 are designed as a sheet metal-like projection in each case, which projection can be connected, in particular, to the vehicle frame (not shown) which is preferably arranged above the frame system in the figure. In this case, the fastening regions 22, 52 can preferably have bores (not shown) for introducing screws which engage with the frame of the utility vehicle. As an alternative, beveled edges which are suitable, in particular, for producing a weld seam with the frame of the utility vehicle or welding windows for establishing spot weld connections to the vehicle frame of the utility vehicle can preferably be provided at the fastening regions 22, 52. For stabilization purposes, the fastening regions 22, 52 each have a first reinforcement region 71 which increases the torsional stiffness of the fastening regions 22, 52. The outer parts 2, 5, the inner parts 3, 6 and the transverse regions 41, 42 advantageously also have first reinforcement regions 71 in their edge regions in each case. In this case, the first reinforcement regions are in each case provided as angled sheet-metal sections for increasing the torsional stiffness on the components of the frame system. As a result, the components, such as the first and the second transverse regions 41, 42 for example, acquire a preferably C-shaped or U-shaped or Z-shaped cross-sectional geometry which allows a particularly high geometrical moment of inertia and permits the transmission of high bending moments at a low weight. Second reinforcement regions 72, which are designed as local portions of thickened material, are particularly preferably provided in the region of the outer bearing regions 24, 54 and especially preferably also in the region of the inner bearing regions 34, 64. As a result, higher forces can be absorbed by the frame system in the bearing regions. A damper fastening 8, in which a vibration damper can be secured to one of the frame units A, B in each case, is further preferably provided on the outer parts 2, 5 and the inner parts 3, 6 in each case. Furthermore, a stabilizing region 9 is preferably provided in the region of the damper fastening 8, which stabilizing region is also especially preferably designed, by way of its contact area which is in each case shown at the top in the figure, for establishing an interlocking or cohesive connection with the vehicle frame of the utility vehicle. The first transverse region 41 and the second transverse region 42 advantageously overlap in an overlap region 43, wherein the bending moments about an orthogonal in relation to the bearing axis L, which bending moments are absorbed by the transverse regions 41, 42, are transmitted in this overlap region 43. It goes without saying that an overlap is therefore possible in this region in which one of the transverse regions 41, 42 has a somewhat smaller extent transversely in relation to the bearing axis L than the respectively other transverse region 41, 42. The inner parts 3, 6 further preferably in each case have a flange section 36, 66 (concealed) for being secured to the respectively opposite outer part 2, 5. In this case, the flange sections 36, 66 are preferably designed as bent sheet metal-like sections of the inner part 3, 6.

Figure 2:
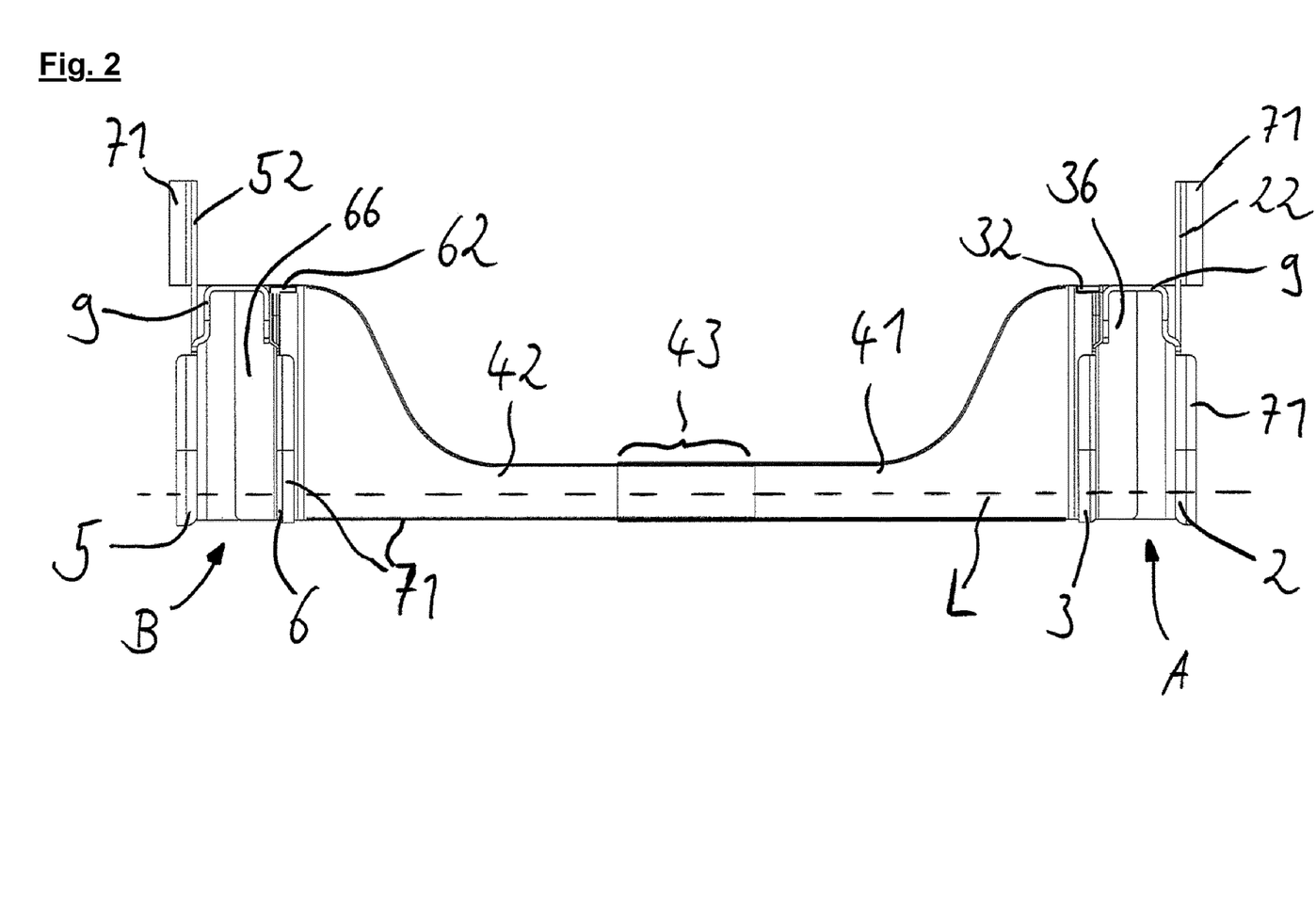
FIG. 2 shows a view of the frame system from FIG. 1 along the longitudinal direction of the vehicle.

FIG. 2 shows a view of the preferred embodiment of the frame system shown in FIG. 1 along an orthogonal in relation to the bearing axis, preferably along the longitudinal direction of the vehicle. Here, the frame units A, B can each be brought into engagement with a section of the frame of the utility vehicle on their sides which are shown at the top in the figure. FIG. 2 clearly shows that the first transverse region 41 and the second transverse region 42 each have a substantially lower extent perpendicular in relation to the bearing axis L at their ends which are averted from the outer part 2, 5 than in their connection region to the outer parts 2, 5. Furthermore, the region of the lower extent, illustrated as being vertical in the figure, of the transverse regions is provided on that side which is averted from the vehicle frame, in other words that is to say at the bottom, in each case. Even better support of the first frame unit A and the second frame unit B against pivoting about an orthogonal in relation to the bearing axis L by the transverse regions 41, 42 is possible in this way. In this configuration, the transverse regions 41, 42 especially preferably form a substantially rectangular frame together with the frame of the utility vehicle. Furthermore, the transition zone, preferably of bent configuration, between the relatively large extent of the transverse regions 41, 42 and the relatively small extent of the transverse regions 41, 42 is also shown in the overlap region 43.

Figure 3:
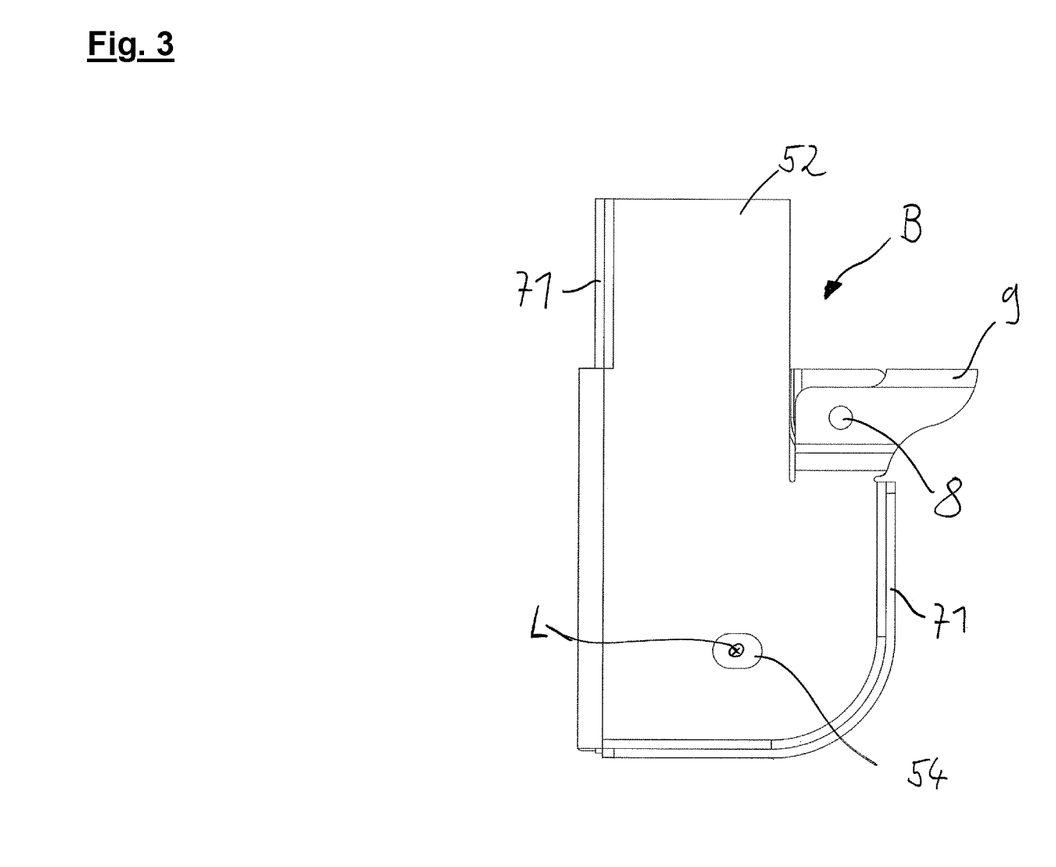
FIG. 3 shows a view of a frame unit along the bearing axis.

FIG. 3 shows a view of the second frame unit B along the bearing axis L. Here, it can be seen, in particular, that the stabilizing region 9 is arranged offset in relation to the damper fastening 8 as seen in the assembled state of the frame system in the longitudinal direction of the vehicle. In this way, a relatively large amount of play for a pivoting movement about a parallel in relation to the bearing axis L remains for a vibration damper which is secured to the second frame unit B. Said figure further shows that the fastening region 52 of the second outer part 5 protrudes beyond the stabilizing region 9 to a considerable extent in the vertical direction. In this case, the fastening region 52 (and also the fastening region 22) can advantageously be secured to the outer side of the vehicle frame in each case, while the stabilizing region 9 is preferably designed to engage on the bottom side of the vehicle frame and therefore ensure support mainly in the vertical direction.

Figure 4:
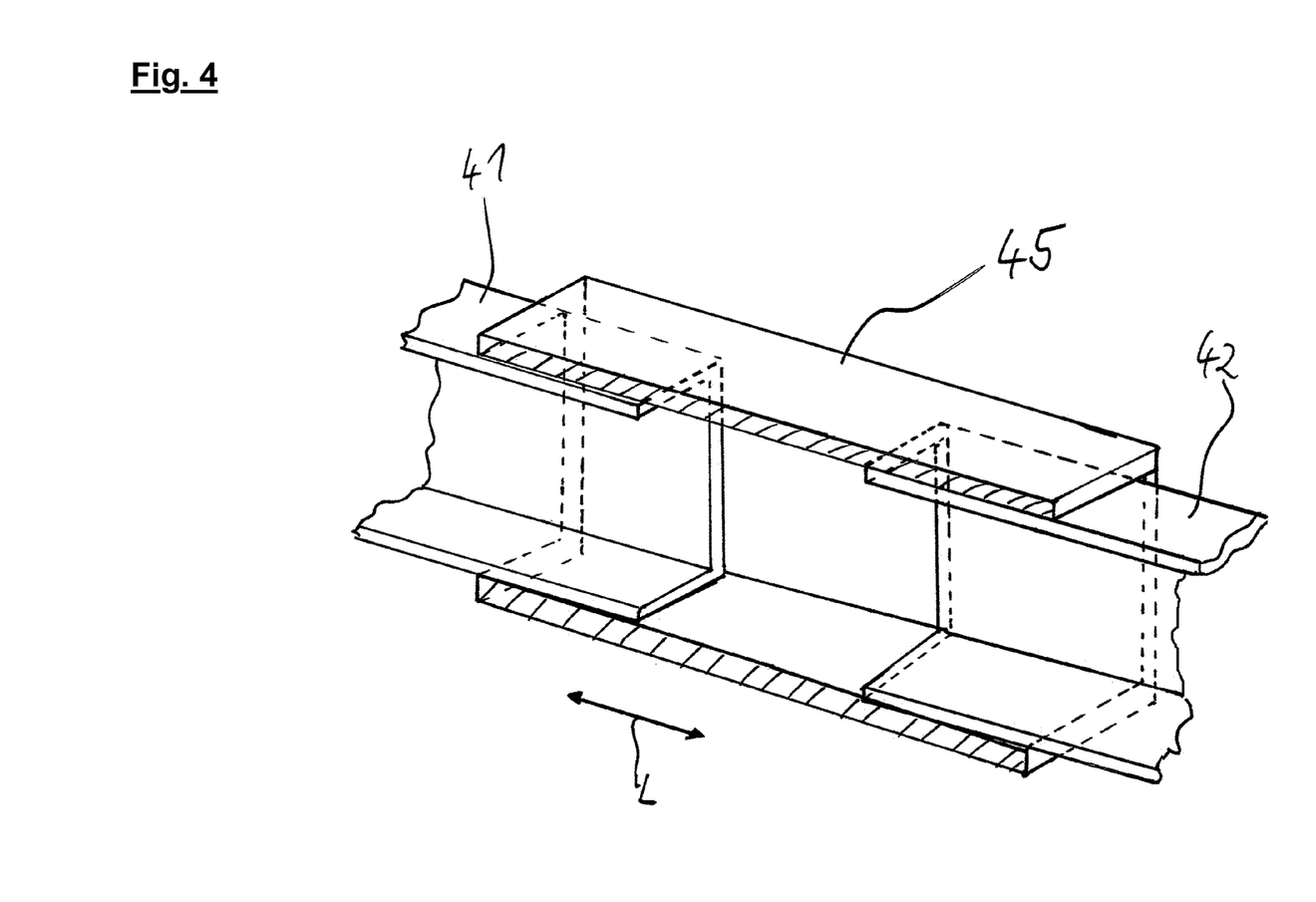
FIG. 4 shows a partially sectioned view of a detail of a preferred embodiment of the connecting region between the first and the second transverse region.

FIG. 4 shows a partially sectioned view of a detail of the connecting region between the first transverse region 41 and the second transverse region 42, wherein a connecting element 45 is used. In the embodiment shown in the figure, the transverse regions 41, 42 are of substantially C-shaped design, wherein the connecting element 45 is preferably designed as a rectangular hollow cuboid. In this case, one of the side faces of the connecting element 45 is sectioned in this view in order to grant a clear view of the interior of the connecting element 45. The transverse regions 41, 42 can advantageously be pushed into the connecting element, wherein a weld connection between the connecting element 45 and the respective transverse region 41, 42 can be established on the outer sides of the connecting element 45 in each case, as seen in the direction of the bearing axis L, in order to permanently secure the transverse regions 41, 42 to the connecting element 45 and therefore indirectly to one another.

LIST OF REFERENCE SYMBOLS

A—(First) frame unit
B—(Second) frame unit
2—First outer part
22—Fastening region
24—Outer bearing region
3—First inner part
32—Fastening region
34—Inner bearing region
36—Flange section
41—First transverse region
42—Second transverse region
43—Overlap region
45—Connecting element
5—Second outer part
52—Fastening region
54—Outer bearing region
6—Second inner part
62—Fastening region
64—Inner bearing region
65—Axle guide
66—Flange section
71—First reinforcement region
72—Second reinforcement region
8—Damper fastening
9—Stabilizing region
L—Bearing axis

The invention claimed is:

1. A frame unit for utility vehicles, comprising:
an outer part;
an inner part; and
a transverse region;
wherein the transverse region and the outer part extend substantially transversely in relation to one another and/or the transverse region and the inner part extend substantially transversely in relation to one another;
wherein the transverse region is integrally formed with the outer part or with the inner part;
wherein the outer part and/or the inner part has a fastening region configured to be secured to a vehicle frame;
wherein the outer part has an outer bearing region and the inner part has an inner bearing region;
wherein an axle guide is arranged between the outer and the inner bearing region and is secured to the bearing regions such that the axle guide pivots about a bearing axis;
wherein the transverse region is configured to absorb torques of the outer part and/or inner part about an orthogonal in relation to the bearing axis;
wherein the transverse region extends substantially along a parallel in relation to the bearing axis;
wherein the first frame unit has a first outer part, a first inner part and a first transverse region, wherein the second frame unit has a second outer part, a second inner part and a second transverse region, wherein the first inner part and the second inner part are arranged between the first outer part and the second outer part, and wherein the first transverse region and the second transverse region are configured to be or are indirectly or directly secured to one another or are integrally formed with one another; and
wherein the first transverse region and the second transverse region form an overlap region, wherein a connection between the first and the second transverse region can be established in the overlap region, which connection transmits bending moments about an orthogonal in relation to the longitudinal axis.

2. The frame system as claimed in claim 1, wherein the overlap region has an extent parallel in relation to the bearing axis that is 0.02 to 0.09 times a maximum distance of the two outer parts from one another.

3. The frame system as claimed in claim 2, wherein the extent of the overlap region in relation to the bearing axis is 0.1 to 0.2 times the maximum distance of the outer two parts from one another.

4. The frame system as claimed in claim 2, wherein the extent of the overlap region in relation to the bearing axis is 0.21 to 0.3 times the maximum distance of the outer two parts from one another.

5. A frame unit for utility vehicles, comprising:
an outer part;
an inner part; and
a transverse region;
wherein the transverse region and the outer part extend substantially transversely in relation to one another and/or the transverse region and the inner part extend substantially transversely in relation to one another;
wherein the transverse region is integrally formed with the outer part or with the inner part;
wherein the outer part and/or the inner part has a fastening region configured to be secured to a vehicle frame;
wherein the outer part has an outer bearing region and the inner part has an inner bearing region;
wherein an axle guide is arranged between the outer and the inner bearing region and is secured to the bearing regions such that the axle guide pivots about a bearing axis;
wherein the transverse region is configured to absorb torques of the outer part and/or inner part about an orthogonal in relation to the bearing axis;
wherein the transverse region extends substantially along a parallel in relation to the bearing axis;
wherein the first frame unit has a first outer part, a first inner part and a first transverse region, wherein the second frame unit has a second outer part, a second inner part and a second transverse region, wherein the first inner part and the second inner part are arranged between the first outer part and the second outer part, and wherein the first transverse region and the second transverse region are configured to be or are indirectly or directly secured to one another or are integrally formed with one another; and
wherein the first transverse region and the second transverse region are indirectly and/or directly fastened to one another in an interlocking manner, and wherein a connecting element is configured to be brought into engagement with the first transverse region and with the second transverse region to transmit a bending moment about an orthogonal in relation to the bearing axis from the first to the second transverse region and vice versa.

* * * * *

UNITED STATES PATENT AND TRADEMARK OFFICE
CERTIFICATE OF CORRECTION

PATENT NO. : 10,875,374 B2
APPLICATION NO. : 16/093879
DATED : December 29, 2020
INVENTOR(S) : Borde et al.

Page 1 of 1

It is certified that error appears in the above-identified patent and that said Letters Patent is hereby corrected as shown below:

In the Specification

Column 1, Line 43:
"region" should be – regions –

Column 2, Line 30:
"region" should be – regions –

Column 7, Line 6:
"region" should be – regions –

Column 7, Line 10:
"region" (1st occurrence) should be – regions –

Column 7, Line 57:
Delete "is for"

Column 9, Line 46:
"region" should be – regions –

In the Claims

Column 12, Claim 1, Line 40:
"region" should be – regions –

Column 13, Claim 5, Line 24:
"region" should be – regions –

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*